Nov. 11, 1969 TSUNEO MORITA 3,478,177

ERASING SYSTEM FOR MAGNETIC TAPES WITH ANGULARLY DISPOSED TRACKS THEREON

Filed Nov. 3, 1966

INVENTOR.
TSUNEO MORITA

BY Hill, Sherman, Meroni, Gross & Simpson ATTORNEYS

United States Patent Office 3,478,177

Patented Nov. 11, 1969

3,478,177

ERASING SYSTEM FOR MAGNETIC TAPES WITH ANGULARLY DISPOSED TRACKS THEREON

Tsuneo Morita, Tokyo, Japan, assignor to Sony Corporation, Shinagawa-ku, Tokyo, Japan Filed Nov. 3, 1966, Ser. No. 591,775
Claims priority, application Japan, Nov. 4, 1965, 40/67,633, 40/67,634
Int. Cl. G11b 5/02
U.S. Cl. 179—100.2 7 Claims

ABSTRACT OF THE DISCLOSURE

This invention deals with an erasing system for magnetic tapes which have angularly disposed tracks recorded thereon which permits complete erasing of the recorded tracks in a direction parallel to the direction of the tracks. This is achieved by either moving an erase head having a gap perpendicular to the line of movement of the tape in a direction perpendicular to the longitudinal axis of the tape while controlling the tape speed and speed of erase head movement so that the effective direction of erasing is parallel to the direction in which the tracks were recorded, or by using a stationary erase head disposed within a slotted rotatable casing, and correlating the speed of rotation of the casing with the speed of tape travel so that the tape is erased by incremental contact with the head along the line of recording.

DISCLOSURE

The present invention relates to magnetic recording and reproducing systems and, more specifically, to erasing systems particularly adapted for use with the erasing of video signals extending angularly along a magnetic tape.

One of the most commonly used methods for recording video signals and the like consists in passing an elongated tape member into contact with a rapidly moving magnetic head under such conditions of relative movement that the intelligence is recorded in spaced parallel lines extending at an acute angle to the longitudinal axis of the tape.

When it is desired to edit such tape as, for example, by deleting or erasing a preselected portion of the tape, the use of a conventional erase head having its erase gap perpendicular to the longitudinal axis of the tape is not satisfactory. When such a stationary head is used, the commencement of the erasing operation cuts off a plurality of the angularly disposed recorded tracks leaving segments of the tracks remaining unerased. Similarly, at the conclusion of the erase operation, segments of recorded tracks are left at the opposite end, because the erasing is done perpendicular to the longitudinal axis of the tape and not parallel to the direction of recording of the tracks. Consequently, there remain intermittent signal portions on the tape, and a resulting noise in the output signal. An overlapping of these signals causes a beat noise to be developed since both recorded signals are frequency modulated or phase modulated. Consequently, it is not possible to reproduce an edited tape without extraneous noise signals being reproduced.

It is possible to erase angularly recorded tracks by positioning a wide erase head having a slanting erase gap. However, the width of the head required for such erasing is so large that it becomes impractical commercially.

One of the objects of the present invention is to provide an erasing system for angularly recorded video tracks and the like which erases along the tracks without using an excessively large head.

Another object of the invention is to provide an improved method for erasing an angularly recorded track from a magnetic tape without leaving unerased track segments at either end of the erased portion.

A still further object of the invention is to provide a method for erasing angularly recorded tracks from a magnetic tape without the use of bulky equipment.

A further description of the present invention will be made in connection with the attached sheet of drawings in which.

As shown in the drawing.

Figure 1:
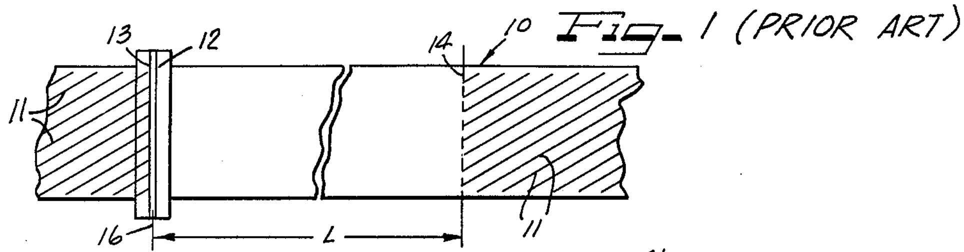
FIG. 1 (PRIOR ART)
FIGURE 1 is a somewhat schematic view of a prior art method of erasing angularly disposed magnetic tapes.

In FIGURE 1, reference numeral 10 indicates generally an elongated magnetic recording medium of the type used to record magnetic impulses. In a typical video recording system used presently, the tape 10 is recorded with parallel recorded tracks 11 which extend at an acute angle to the longitudinal axis of the tape 10. In a conventional system of erasing, an erase head 12 having an erase gap 13 is positioned with a gap 13 perpendicular to the longitudinal axis of the tape 10. At the starting line of the portion to be erased, identified at reference numeral 14 of the drawing, the head 12 serves to erase the recorded tracks 11 directly across the width of the tape, leaving segmental tracks remaining at the starting line 14. Similarly, when an amount of the tape illustrated by the length L in FIGURE 1 is erased, terminating at a stop line 16, segments of the remaining tracks 11 will remain. Then, if the length L is eliminated and the non-erased portions joined together, the segments remaining from the unerased tracks provide an objectionable noise signal.

Figure 2:
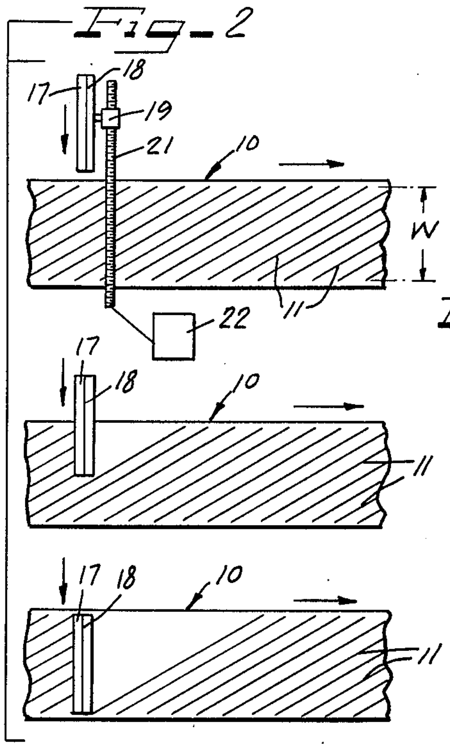
FIGURE 2 illustrates somewhat schematically the sequence of operations involved when employing the improved erasing method of the present invention.
Figure 3:
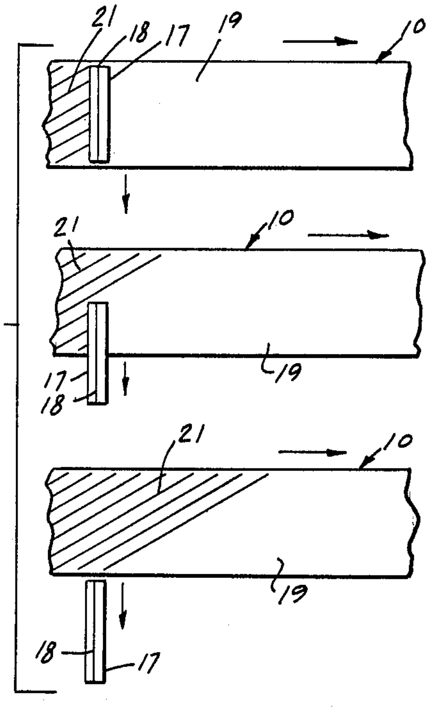
FIGURE 3 is a schematic representation of a succeeding portion of the method of the present invention.

The improved system of the present invention is illustrated, in one form, in FIGURES 2 and 3. FIGURE 2 illustrates a magnetic tape 10 having the angularly disposed record tracks 11 thereon and being provided with means for moving the tape in the left to right direction as seen in FIGURE 2. An erase head 17 having a gap 18 thereon, perpendicular to the longitudinal axis of the tape 10, is mounted on a follower 19 which engages a rotatable screw 21. The screw 21 is driven by a motor 22 at a uniform velocity. The width of the erase gap 18 is substantially the same as the width of the tape 10. The speed of translation of the erase head 17 is selected so that it represents the quotient of the effective width of the tape in the translating direction divided by the tracing time required to record one angularly disposed track 11. The effective width of the tape has been indicated at reference character W in FIGURE 2.

When the erase head 17 is moved transversely of the tape 10 at this velocity, at the proper linear speed of the tape 10, the tracks 11 will be effectively erased in an erasing direction which is parallel to the remaining tracks 11 as illustrated in the middle and lower showings of FIGURE 2. Then, as the tape 10 and the head 17 move with the proper velocities, the head 17 will extend across the recorded width of the tape as illustrated in the lower showing of FIGURE 2. With the erase head 17 extending across the width of the tape, the tracks can then be erased completely in the normal fashion for the desired length of time, leaving an erased portion 19 and an unerased portion 21 to the left of the head 17, as illustrated in the upper showing of FIGURE 3. Then, the movement of the head 17 can be resumed in the downward direction as seen in FIGURE 3, with the speed of the tape and the translating speed of the head 17 being adjusted as previously so that the head 17 erases only complete tracks, as illustrated in the two lower showings of FIGURE 3. Finally, when the erasure is completed, the head 17 is beyond the edge of the tape 10 as illustrated in the lower showing of FIGURE 3.

Figure 4:
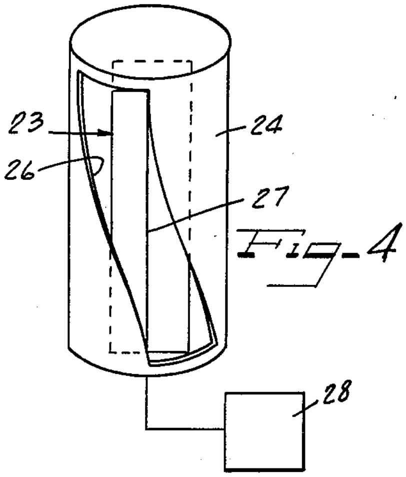
FIGURE 4 is a view in perspective of an improved magnetic erase head according to the present invention.

A particularly preferred embodiment of the invention is illustrated in FIGURE 4. This embodiment makes use of a stationary erase head 23 which is enclosed in a hollow cylinder 24 composed of non-magnetic material. The cylinder 24 is provided with a slot 26. The stationary erase head 23 has an erase gap 27 formed therein in the usual manner. The cylinder 24 is rotated by means of a drive motor 28 at a uniform velocity. Thus, as the cylinder 24 is rotated, and the tape is drawn across the slot, incremental portions of the erase gap 27 are exposed to the tape and erasing is effected along the line of recording of the tape. It should be recognized, of course, that the length of the slot 26 can be adjusted to erase less than all of the width of the tape, which might be desirable in the event that control signals are positioned on the margin of the tape and only the recorded signals are to be erased.

Figure 5:
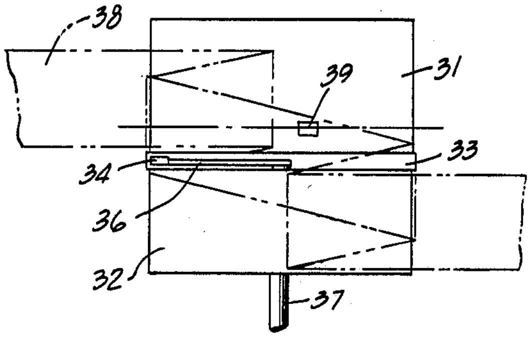
FIGURE 5 is a somewhat schematic view of a recording assembly which can be used to provide angularly disposed control signals as well as the angularly disposed record tracks.

Magnetic tapes used for video recording are frequently provided with control signals at the margin thereof to compensate for tracking errors lengthwise of the tape, the signals being used to energize control systems to compensate for any such deviation. However, the control signals are frequently placed on the tape in a direction perpendicular to the longitudinal axis of the tape, whereas the recorded intelligence is at an angle to this axis. Such systems, however, are incapable of compensating for tracking errors caused by deviations in the tape width. To correct this, the recording system of the type shown in FIGURE 5 can be employed. This system makes use of two highly polished stationary drum segments 31 and 32 separated by a gap 33 in which a recording head 34 is mounted. The recording head extends from an arm 36 which is connected to a spindle 37 driven by a suitable motor. A tape 38 is partially trained about the drums 31 and 32 as shown in FIGURE 5 and is pulled therearound at a constant velocity. A control head 39 is mounted on the drum 31 and applies spaced control signals at the periphery of the tape 38 as it is pulled about the drum segments. At the same time, the rotating recording head 34 is applying the intelligence to the tape along angularly disposed recording tracks. With this system, the control signals 39 are recorded in tracks which are parallel to the tracks being recorded by the recording head 34.

The type of recording shown in FIGURE 5 produces a record which is particularly amenable to erasure by the system of FIGURE 3, in that the effective erasing correction of the erase head is parallel to both the recorded tracks and the control tracks, so that all of the signals on the tape can be easily and completely erased in one pass.

It should be evident that various modifications can be made to the described embodiments without departing from the scope of the present invention.

I claim as my invention:

1. The method of erasing a magnetic tape having spaced recorded tracks at an acute angle to the longitudinal axis of said tape which comprises moving said tape along its longitudinal axis and bringing said tape into contact with an erase head having a gap disposed perpendicular to said longitudinal axis, and providing relative movement between said tape and said erase gap at such a rate that the direction of erasing is parallel to the direction of said recorded tracks.

2. The method of claim 1 in which said erase head is moved in a direction perpendicular to the line of movement of said tape.

3. The method of claim 1 in which said erase head is stationary and the erase gap is incrementally exposed to said tape as the tape moves thereacross.

4. The method of claim 2 in which said erase head has substantially the same width as the width of said tape.

5. An erasing system for erasing a magnetic tape having spaced parallel recorded tracks at an acute angle to the longitudinal axis of said tape which comprises means for moving said tape along its longitudinal axis, an erase head having an erase gap disposed perpendicular to the line of movement of said tape, and means for moving said erase head at a uniform velocity perpendicular to the longitudinal axis of said tape such that a given point on the gap remains on the same recorded track as said erase head is moved across the tape.

6. The system of claim 5 in which said erase head is mounted for movement on a screw, and also includes a motor for rotating said screw.

7. An apparatus for erasing a magnetic tape having spaced recorded tracks at an acute angle to the longitudinal axis of said tape which comprises means for moving said tape along its longitudinal axis, an erase head having an erase gap positioned perpendicular to said longiutdinal axis, and means for positioning a given portion on said erase gap against a given recording track so that said given portion on said gap can continually contact said given track during such relative movement.

References Cited

UNITED STATES PATENTS

| | | | |
|---|---|---|---|
| 2,610,257 | 9/1952 | Wissmann | 179—100.2 |
| 3,342,949 | 9/1967 | Wessels | 179—100.2 |

BERNARD KONICK, Primary Examiner

R. S. TUPPER, Assistant Examiner